Aug. 19, 1952     L. O. FRENCH     2,607,366
DUAL FUEL VALVE
Filed Aug. 11, 1951
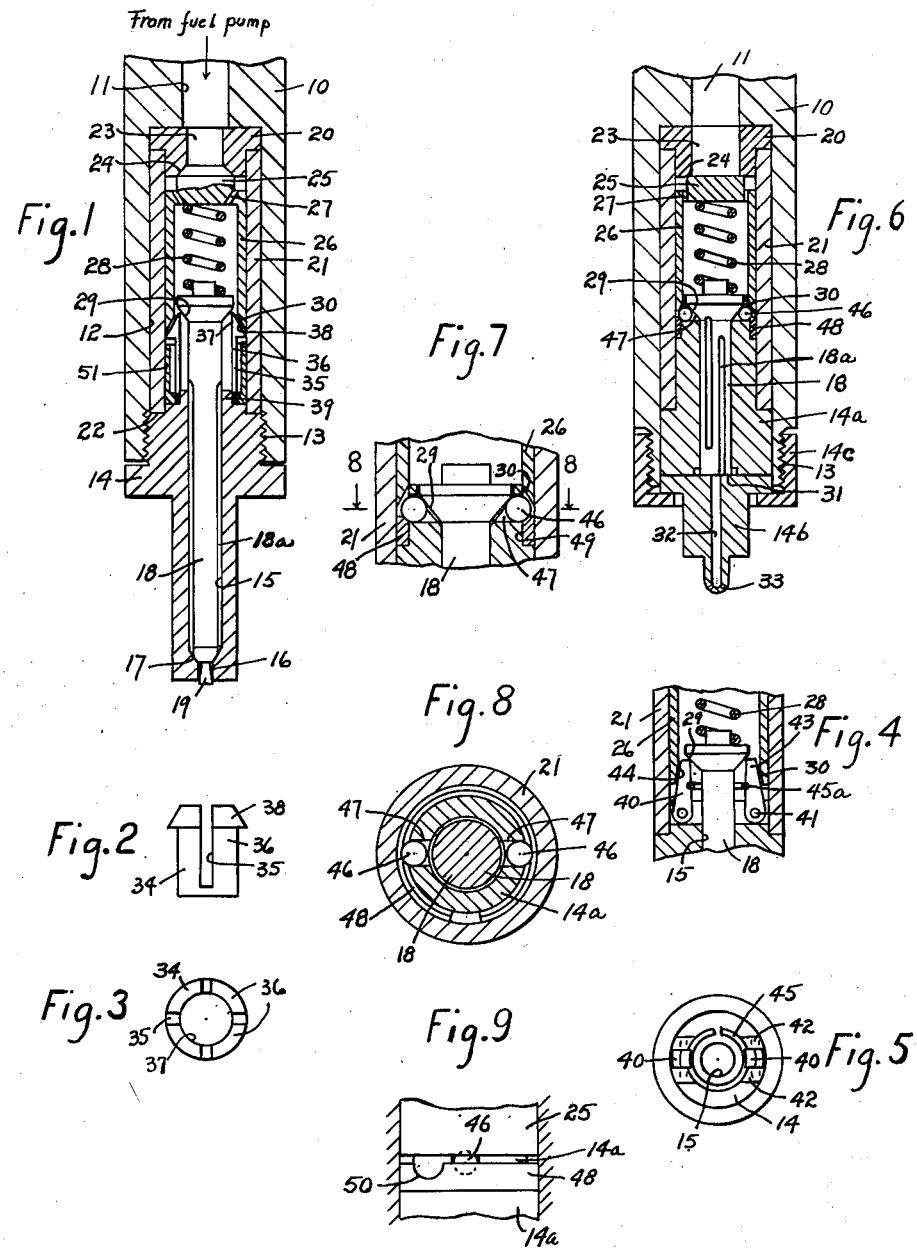
INVENTOR.
Louis O. French Patented Aug. 19, 1952

2,607,366

UNITED STATES PATENT OFFICE 2,607,366

DUAL FUEL VALVE

Louis O. French, Milwaukee, Wis.

Application August 11, 1951, Serial No. 241,453

8 Claims. (Cl. 137—506)

The invention relates to valves and more particularly to dual fuel valves controlling the injection of fuel into internal combustion engines or oil fired furnaces or boilers and of the type in which the valves reciprocate in opposite directions relative to each other.

The object of the invention is to provide a dual valve arrangement comprising an outwardly opening fuel pressure operated check valve, an inwardly opening fuel control valve, and wedging means between said valves operable by the check valve to move the fuel control valve bodily to open position.

The invention further consists in the several features hereinafter set forth and more particularly defined by claims at the conclusion hereof.

In the drawings:

Fig. 1 is a vertical sectional view through a valve structure embodying the invention;

Fig. 2 is a side elevation view of the wedge means shown in Fig. 1;

Fig. 3 is a top plan of the wedge means shown in Fig. 1;

Fig. 4 is a detailed vertical sectional view showing a modified form of wedging means;

Fig. 5 is a plan view of parts shown in Fig. 4;

Fig. 6 is a sectional view similar to Fig. 1 showing certain modifications;

Fig. 7 is an enlarged detailed view of parts shown in Fig. 6;

Fig. 8 is a detailed horizontal sectional view taken on the line 8—8 of Fig. 7;

Fig. 9 is an elevational view of parts shown in Fig. 7.

Referring to the drawings, the numeral 10 designates a casing or housing part provided with a fuel inlet 11 communicating with a bore 12 having a lower threaded end 13. Fuel under pressure is supplied to the inlet 11 either by a separate pump and piping or by a pump of any suitable kind mounted in the housing in which case the check valve hereinafter described forms the discharge check valve of the pump. For internal combustion engines, the pumps above referred to usually are intermittently acting plunger type fuel metering pumps.

Referring to Fig. 1, a fuel discharge passage member 14 has threaded engagement with end 13 of the housing and is provided with centrally disposed concentric bores 15 and 16 having a valve seat 17 between said bores. A fuel control or needle valve 18 is mounted in the bore 15 to seat on the seat 17 and provided with flats or filtering grooves 18a and with a pintle projection 19 extending through the bore 16 and cooperating therewith to form a spray nozzle. Instead of a pintle projection, the valve may terminate at the seat and the nozzle be of the form shown in Fig. 6.

A seat member 20 is mounted in the upper end of the bore 12 and seats on one end of a casing sleeve 21 whose other end seats on a shoulder 22 formed on the member 14, which member clamps these parts together in sealing relation with each other, the housing 10 and said member. The member 20 has a centrally disposed passage 23 with a valve seat 24 at the lower end thereof.

A discharge check valve 25 has a head normally seating on the seat 24 and a hollow stem 26 slidably mounted in the bore of the sleeve 21, said head having fuel passages 27 connecting the space above the head with the interior of said valve.

A compression coiled spring 28 is interposed between the valves 18 and 25 and normally holds both valves on their seats.

Fuel under pressure or put under pressure in the inlet 11 acting on the valve 25 opens it against the loading of the spring 28, and the movement imparted by the fuel to said valve is used to move the valve 18 bodily inwardly of the housing and off its seat 17 through wedge means hereinafter described.

The upper end of the stem of the valve 18 is enlarged to provide an inclined wedge surface 29, and the lower end portion of the stem 26 is bevelled to provide a wedge surface 30. The valve 25 may have a flat seating engagement with its seat member 20 as shown in Fig. 6 which also shows the valve 18 as having a flat seating engagement with a seat 31 formed on a part 14b provided with a passage 32 leading to one or more spray orifices 33. The part 14b and a guide member 14a act as a fuel discharge member similar to the member 14 and are made as two parts to facilitate grinding the valve 31 and easier cleaning of the orifices 33. In Fig. 6 the seat member and casing sleeve are the same as those of Fig. 1 and are clamped with the parts 14a and 14b in assembled relation by a sleeve nut 14c engaging the threaded end 13 of the casing part 10.

The wedge means between the valves 18 and 25 is shown in Figs. 1 to 3 as comprising a resilient metal tube 34 which is provided with radially disposed lengthwise extending slots 35 to form a plurality of movable wedge members 36 which at their upper ends have surfaces 37 and 38 which cooperate, respectively, with the surfaces 29 and 30 of the valves 18 and 25. The surface 29 is at a more acute angle to the horizontal than the surface 37, for example, the surface 29 may be inclined from thirty to sixty, preferably forty-five, degrees while the surface 37 is ninety degrees. A line or substantially line contact between these contacting surfaces is preferred. The surface 38 engaging the surface 30 of the valve 25 may be of the same inclination or slightly less than that of the surface 30.

The base of the tube 34 fits over a small cylindrical projection 39 on the fuel discharge member.

With this form of wedge means, when the valve 25 under the action of fuel pressure from the inlet 11 moves outwardly off its seat 24, the wedge surface 30 engages the surface 38 of the wedge members 36 and acts to force these members inwardly, thus pressing their surfaces 37 into engagement with the surface 29, and since the valve 18 can move, it is moved upwardly or inwardly of the housing against the loading of the spring 28, the surfaces 37 sliding along the surfaces 29. The resiliency of the tube 34 permits the inward flexing of the wedges 36. As soon as the fuel pressure drops, the spring 28 returns the valve 25 to its seat, relieving pressure on the wedges 36 which then under their own spring action and the pressure of the spring 28 on the valve 18 move back to a release position and permit the spring 28 to close the valve 18.

Instead of the tube 34, the wedges as shown in Figs. 4 and 5 may be small solid metal movable wedge members 40, diametrically disposed relative to the valve 18 and pivotally mounted on pins 41 carried by spaced ears 42 formed in the upper end of the member 14, said members having wedge surfaces 43 and 44 cooperating with the surfaces 29 and 30 in the same way as the wedge elements 36. To permit ready release of the members 40 after the valve 18 is opened, a split spring ring 45 engaging in recesses 45a above the pivots of these members is put under compression when the valve 25 moves against these members to open the valve 18 and acts to release said members when the fuel pressure drops and the spring 28 acts to move the valves 25 and 18 to a closed position.

The wedge members may, as shown in Figs. 6 to 9, be metal balls (ball bearings) 46 which are mounted in guide bores 47 formed in the upper reduced diameter part of the member 14. Two, three, or four balls radially disposed relative to the valve 25 and equidistantly circumferentially spaced may be used. Two diametrically disposed balls are shown. To retain the balls in an operative position and in assembled relation with the valve 25, a retainer ring 48, either a split spring ring as shown in Fig. 8 or a notched ring as shown in Fig. 9, is closely fitted in a recess 49 in the member 14. Either the notch 50 or the spacing of the ends of the split ring is such as to allow passage of a ball 46 into its guide bore 47 when the notch or this space is alined with the bore, and then the ring 48 is turned so that the ball 46 will be prevented from rolling out of the bore and be confined between said ring and the valve 25. The valves 18 and 25 are the same as in the first described form and are similarly numbered, and the operation of this form of the invention is the same except that the balls 46 have point contact with the wedge surfaces of the valves 18 and 25. While in Figs. 6 and 7 the wedge surface 30 has been shown as inclined at an acute angle, when the length of the bore 47 is such that only a small portion of the ball 46 projects beyond the outer end of this bore, it has been found that the contacting surface of the valve 18 with the ball need not be bevelled but be at substantially ninety degrees to the horizontal. This form of the invention is more easily made and is cheaper to produce than the previously described forms and also the wedge means takes up less space.

The above described structures have certain definite advantages over the usual differential type needle valves in that the check valve stops blow back of gases from an engine cylinder into the fuel inlet 7 in case the control valve 18 is leaking for any reason, and since this check valve is mechanically connected to the oppositely moving control or needle valve, the use of long lapped fits or packings for the stem of this needle valve is obviated. Also the control valve 18 does not have to be as heavily loaded initially to provide the desired fuel injection pressure since the fuel pressure itself acting on an area equal to the seating area of this valve must be overcome before this valve opens. To insure this action, the seating area of the valve 25 is greater than the seating area of valve 18 to provide a differential fuel pressure sufficient to actuate the wedge members and overcome the increased loading of the spring 28 when the wedge members act on the valve 18. The valve 18 being separate and distinct from the wedge members can be tightly seated by the spring 28, though the wedge members 36 if sufficiently resilient may contact the valve 18 in its closed position. Preferably a small clearance between the members 36 and the valve 18 is provided. The clearances shown in the drawing between the valve 25 and the wedge members are somewhat exaggerated for the sake of clearness.

The lift of the valve 18 as shown in Fig. 1 may be limited by a stop sleeve 51 which limits the movement of the valve 25 and hence the wedging movement of the members 36 on the valve 18.

The lift of the valve 18 in Fig. 4 is limited by the movement of the wedge members 40 against the stem proper of the valve 18.

The lift of the valve 18 in Fig. 6 may be limited by the engagement of the lower end of the valve 25 with the retainer ring 48.

I desire it to be understood that this invention is not to be limited to any particular form or arrangement of parts except in so far as such limitations are included in the claims.

What I claim as my invention:

1. In a dual valve structure, the combination of a housing provided with a fuel inlet passage and a fuel discharge passage, a fuel pressure operated check valve controlling said inlet passage and opening outwardly therefrom, a fuel control valve for said discharge passage and opening inwardly toward said check valve, a spring interposed between said valves to move them to a normally closed position, said valves having wedging surfaces, and wedging means distinct from said valves including movable wedge members disposed between said valves and cooperating with said wedging surface whereby the movement of said check valve under fuel pressure moves said wedging means to effect the bodily opening movement of said fuel control valve.

2. In a dual valve structure, the combination of a housing provided with a fuel inlet passage and a fuel discharge passage, a fuel pressure operated check valve controlling said inlet passage and opening outwardly therefrom, a fuel control valve for said discharge passage and opening inwardly toward said check valve, a spring interposed between said valves to move them to a normally closed position, said check valve having a hollow stem provided at its outer end portion with a wedging surface, said fuel control valve having a stem provided with an annular wedging surface inclined from the axis of said stem, and a plurality of movable wedge members disposed between and engageable with the wedging surfaces of said valves, said wedge members being moved by the check valve to exert a wedge opening movement of said fuel control valve.

3. The valve structure as defined in claim 2 wherein the movable wedge members are radially disposed metal balls mounted in the housing.

4. The valve structure as defined in claim 2 wherein the housing is provided with radially disposed guide bores adjacent the wedging surface of the control valve and the movable wedge members are metal balls disposed in said guide bores and retained therein by a shiftable ring member mounted on said housing, said ring member forming a stop for the check valve to limit the lift of said control valve.

5. The valve structure as defined in claim 2 wherein the wedge members are diametrically disposed solid metal members mounted in said housing for movement relative to said valves.

6. The valve structure as defined in claim 2 wherein the movable wedge members are formed as parts of a hollow tube of resilient metal mounted in said housing.

7. The valve structure as defined in claim 2 wherein the wedging connection between the wedge surface on the stem of the fuel control valve and the movable wedge members is substantially a line contact.

8. The valve structure as defined in claim 2 wherein the lift of the control valve is limited by limiting the lift of the check valve.

LOUIS O. FRENCH.

REFERENCES CITED

The following references are of record in the file of this patent:

UNITED STATES PATENTS

| Number | Name | Date |
|---|---|---|
| 2,124,133 | Bellem | July 19, 1938 |